United States Patent [19]

Olson

[11] 3,868,467

[45] Feb. 25, 1975

[54] PRESTARTER COMPOSITIONS

[75] Inventor: Eldred Olson, Colfax, Ill.

[73] Assignee: Vi-Amino Feeds, Inc., Colfax, Ill.

[22] Filed: Jan. 2, 1973

[21] Appl. No.: 320,309

[52] U.S. Cl.............. 426/208, 426/210, 426/2, 426/377
[51] Int. Cl............................................. A23k 1/00
[58] Field of Search ............. 99/2; 426/208, 210, 2, 426/205, 212, 224, 352, 364, 374, 377, 807

[56] References Cited
UNITED STATES PATENTS

| | | | |
|---|---|---|---|
| 1,990,329 | 2/1935 | Johnson | 426/208 |
| 2,168,138 | 8/1939 | Sakurai | 426/208 |
| 2,806,789 | 9/1957 | Kiser | 99/2 ND |
| 2,819,968 | 1/1958 | Colby | 99/2 N |
| 2,924,524 | 2/1960 | Martin | 99/2 N |
| 3,615,674 | 10/1971 | Johnston | 426/208 |

OTHER PUBLICATIONS

Watkins, National Hog Farmer, Webb Publ. Co., St. Paul, Minn. Nov. 1971.

Feeds and Feeding – Morris Ithica, N.Y. 1957, p. 849, 850, 870, 871, 934, 1124, 1126, 1127.

Primary Examiner—A. Louis Monacell
Assistant Examiner—Hiram H. Bernstein

[57] ABSTRACT

A feed composition useful as a prestarter for pigs to establish the pigs from a weaning schedule to an independent feeding schedule. The prestarter composition includes as essential ingredients high lysine corn and wheat germ meal in required proportions and thereby provides a feed which has reduced levels of crude protein and which substantially decreases the incidence of scouring in young pigs. In addition, the composition is highly acceptable to young pigs, has excellent digestability and provides good nutrition so that more rapid growth is achieved.

13 Claims, No Drawings

PRESTARTER COMPOSITIONS

This invention relates to a prestarter feed composition for pigs; and particularly relates to an improved prestarter composition which has reduced amounts of crude protein to reduce scouring while maintaining growth factors at favorable levels.

It is customary for growers to start pigs on prestarters while they are still on sow's milk. Pigs normally are weaned in 4–5 weeks. Generally in the 2–4 week period following weaning, the pigs are developing stamina, general health, and tolerance for feeds. Following the weaning period, the pigs are generally placed in environmentally controlled buildings, or nurseries, where they commence feeding or continue feeding on prestarter compositions. These buildings have controlled temperature, humidity, feeding aids, and the like. Growers recognize that it is highly desirable to have the pigs attain weight, strength and the like as rapidly as possible so they can develop disease-resistance, attain sufficient stamina to independently attend to their feeding, and grow sufficiently for the market.

It is highly desirable to shorten the weaning period and the nursery period, or in the alternative, to get the pigs in better shape at the end of the given nursery period. After such nursery period, less sophisticated facilities are needed with respect to controls, feeding and the like in order for the pigs to reach market weight. Prestarter compositions are conventionally used to attain these objectives.

It has become recognized in the art that such prestarter compositions contain a very narrow range of lysine of about 1 – 1.2%. Lysine is one of the most important of the ten essential amino acids, especially during the early nutritional period of piglets. Lysine is a limiting essential amino acid in the sense that minimal amounts are critical to build a protein in the sense that minimal amounts are critical to build a protein block or molecule. Conventional prestarter compositions are therefore characterized by containing sufficient crude protein to provide the desired minimal amounts of lysine. Such protein is generally about 20% of the total composition, and often higher.

Conventional prestarter compositions have high crude protein levels, generally in excess of 18% by weight. Such prestarter compositions are known to result in a high incidence of scouring when fed to young pigs. The scouring or diarrhea is recognized as being nutritionally related, that is, induced by nutritional features of the feed itself. In particular, such nutritional features are believed to be inherently present in the protein component of the feed so that scouring is directly proportional to the amount of protein present, expressed as total crude protein or protein ratio. The scouring, at the very least, impedes the growth schedule and slows down attainment of physiological independence by the pigs. In more serious forms, it constitutes a hazard to the health of the pigs, and has been the cause of death in a number of cases.

It is accordingly an important object of the present invention to provide a new and improved composition which substantially reduces the incidence of scouring in young pigs while providing good nutrition to attain rapid growth of young pigs.

It is another important object of the present invention to provide an animal feed composition which includes balanced ingredients as favorable sources of lysine, and which ingredients are characterized by other advantages such as providing adequate protein levels, high levels of animal acceptability, desirable digestability, and general animal stamina.

It is still yet another important object of the present invention to provide a prestarter composition of the type described which can shorten the weaning period of pigs and which prestarter can then be used to advantage by pigs, after such earlier weaning periods, for a period during early growth.

It is yet still another important object of the present invention to provide a prestarter composition of the type described which leads to improve average daily gain for pigs, improved food conversion ratio and economical gain in terms of the cost of the prestarter required to attain gain in weight.

The above objects are now attained together with other objects and advantages which will occur to practitioners after considering the following disclosure of the invention.

The prestarter composition of this invention includes high lysine corn having a lysine content of at least about 0.3% by weight of corn and wheat germ meal, the high lysine corn being present in an amount of from about 25% to about 65% by weight and the wheat germ meal in an amount of from about 10% to about 40% by weight, with the total protein ratio of the composition being not in excess of about 18%. In addition, the high lysine corn and the wheat germ meal ingredients have relative proportions such that one ingredient is accordingly increased as the other is reduced to substantially maintain the total protein ratio within the prescribed maximum level of less than about 18%. Added lysine may or may not be included in the composition, depending on other protein sources. It is required that the feed composition provide at least 1% by weight lysine, from the protein component or added. When added, lysine is included in the composition, it is present in an amount of less than about 0.5% by weight.

The combination of high lysine corn and wheat germ meal in the proportions described provides a prestarter composition which markedly reduces the incidence of scouring or diarrhea in young pigs in the weaning and nursery periods; is very acceptable and digestible; and supplies good nutrition so that more rapid growth rate is achieved.

The protein ratio or crude protein level of the feed composition is substantially determined by the high lysine corn and wheat germ meal ingredients, although other protein components may be present. Balanced proportions of these two food ingredients can provide the required minimum level of about 1% by weight of lysine in the composition, but it is preferred that added lysine be provided so that the feed composition may be formulated to include desirable ingredients in addition to the high lysine corn and wheat germ meal. Such other ingredients may include whey, dried milk, oats, vitamins, mineral and antibiotic premixes, as well as still others.

Lower protein ratios are provided for the feed compositions disclosed herein, generally not in excess of about 18% by weight. Such lower ratios reduce substantially the incidence of scouring in piglets during weaning and nursery periods. This is a recognized advantage of the composition, but a further advantage is the enhanced nutritional value of the feed composition despite the reduction in the total crude protein level.

These improved features arise from the presence of the high lysine corn and the wheat germ meal in balanced proportions.

It has been found that the total composition should contain at least about 10% by weight of the wheat germ meal, and at least about 25% of the high lysine corn. As the proportion of high lysine corn is increased, the wheat germ meal may be decreased to a minimum level of about 10%. In general, the combination of the wheat germ meal and the high lysine corn constitutes a major percentage of the total feed composition, say at least about 75% by weight. The wheat germ meal may be increased to an amount of about 35–40% by weight to thereby decrease the high lysine corn content to about the same level. Accordingly, the wheat germ meal content of about 10% will be accompanied by a high lysine corn content of more than 50% of the total composition.

The improved composition of this invention preferably includes added lysine up to a maximum quantity of about 0.5% by weight depending upon other protein sources or ingredients in the composition. Dried whey is preferably included as an ingredient. Whey is a source of added protein and carbohydrates and further enhances animal acceptability. It is also preferred to include in the composition a standard nutritional premix as well as steam rolled oats, the latter providing still more carbohydrates. Various premixes are available to pig growers and generally are comprised of a combination of minerals, vitamins and small quantities of antibiotics for growth and protection from disease. It will be appreciated that the practitioner may provide additional or alternative feed ingredients for the feed composition.

The added lysine is provided usually where the feed composition contains a high percentage of high lysine corn, thereby lowering the amount of wheat germ meal which can be present so that the composition can accommodate the presence of other desirable ingredients. Added lysine will also be an ingredient if both high lysine corn and wheat germ meal are present in lower percentages in the prescribed range. A preferred composition, however, will have one of the ingredients present in a high range while the other is present in a correspondingly lower range. In any event, the feed composition will have a total of at least 1% by weight of lysine, whether from the food ingredients alone or together with added lysine.

A total of ten different feed compositions are prepared to present illustrative embodiments of the invention. Following Table I lists such formulations, each of which provide crude protein levels below 18% by weight and total lysine of at least 1% by weight. In general, preferred embodiments will contain from about 1.1% to about 1.2% lysine, by weight. The best mode presently contemplated for practicing the invention also provides that the total of the high lysine corn and the wheat germ meal do not exceed about 75% by weight of the composition so that other desired ingredients may be included.

A prestarter composition made in accordance with the invention is compared with three well known, widely used commercial prestarter compositions for the purpose of determining the following factors:
1. Average daily gain (ADG)
2. Pounds of feed required per pound of gain (Lb/Lb-Gain)
3. Cost of Gain for the total period of test (Cost)
4. Incident of diarrhea or scours (scale of 1–10)

The scale for scours is semiquantitative, the number 10 being viewed as high incidence of scours, the number 5 being viewed as moderate incidence and the number of 0 as low incidence.

The prestarter composition of the invention and the three commercial prestarter compositions contain the same antibiotic makeup with respect to identity and amount, namely:

| | |
|---|---|
| Chlortetracycline | 100 grams per ton |
| Sulfamethazine | 0.011% |
| Penicillin (from Procaine Penicillin) | 50 grams per ton |

The crude protein, fat and fiber contents of three commercial preparations are compared with the low scour and high growth prestarter composition of the invention (LS-HG). As follows:

| | LS-GH | Comm. No. 1 | Comm. No. 2 | Comm. No. 3 |
|---|---|---|---|---|
| % Crude Protein, Min. | 14.0 | 18.0 | 20.0 | 18.0 |
| % Crude Fat, Min. | 3.5 | 5.5 | 5.0 | 4.5 |
| % Crude Fiber, Max. | 4.0 | 2.5 | 2.0 | 3.0 |

The composition and ingredients of the prestarter composition of the invention are listed with the ingredients for the three commercial preparations as provided by the suppliers:

LS-HG PRESTARTER COMPOSITION

| | |
|---|---|
| Steam Rolled Hulled Oats | 15.00% |
| Dried Whey | 10.00% |
| Wheat Germ Meal | 35.00% |
| High Lysine Corn | 36.00% |
| Added Lysine | 0.15% |
| Premix | 3.85% |

TABLE I

| TOTAL PROTEIN | No. 1 | No. 2 | No. 3 | No. 4 | No. 5 | No. 6 | No. 7 | No. 8 | No. 9 | No. 10 |
|---|---|---|---|---|---|---|---|---|---|---|
| | | | | PERCENT BY WEIGHT | | | | | | |
| Hight Lysine Corn | 35.35 | 15 | 65 | 50.25 | 55.20 | 44.75 | 37.25 | 35 | 60.25 | 35.25 |
| Wheat Germ Meal | 35 | 40 | 10 | 20 | 15 | 25.5 | 33 | 35.25 | 25 | 35 |
| Whey | 10 | 10 | 10 | 10 | 10 | 10 | 10 | 10 | 10 | 10 |
| Steam Rolled Oats | 15 | 15 | 10.15 | 15 | 15 | 15 | 15 | 15 | — | 15 |
| Premix | 4.5 | 4.5 | 4.5 | 4.5 | 4.5 | 4.5 | 4.5 | 4.5 | 4.5 | 4.5 |
| Added Lysine | 0.15 | — | 0.35 | 0.25 | 0.30 | 0.25 | 0.25 | 0.25 | 0.25 | 0.25 |
| Cane Sugar | — | 15.5 | — | — | — | — | — | — | — | — |
| Total Protein % | 17.6 | 17.4 | 12.3 | 14.15 | 13.0 | 15.4 | 17.17 | 17.65 | 14.4 | 17.6 |
| Total Lysine % | 1.20 | 1.05 | 1.02 | 1.05 | 1.02 | 11.14 | 1.26 | 1.30 | 1.09 | 1.30 |

Ingredients: Soybean meal, steam rolled oat groats, high lysine corn, wheat germ meal, salt, L-lysine HCL, dicalcium phosphate, dried whey, dried whey fermentation solubles, dehydrate alfalfa meal, animal fat (preserved with BHA) dried buttermilk, vitamin A palmitate, D-activated animal sterol (source of vitamin $D_3$), vitamin $B_{12}$ supplement, choline chloride, niacin, calcium pantothenate, riboflavin supplement, manganese sulfate, ferrous sulfate, ferrous carbonate, iron oxide, copper oxide, cobalt carbonate, potassium iodide, zinc sulfate, and calcium carbonate.

COMMERCIAL PRESTARTER COMPOSITION NO. 1

Ingredients: Dried Skimmed Milk, Feeding Oat Meal, Dried Whey, Ground Yellow Corn, Dehulled Soybean Meal, Cane Sugar, Animal Fat Preserved with BHA, Vitamin A Palmitate, Riboflavin Supplement, Calcium Pantothenate, Niacin, Vitamin $B_{12}$ Supplement, Vitamin E Supplement, Choline Chloride, Menadione Sodium Bisulfite, D-Activated Animal Sterol (Source of Vitamin $D_3$) Ethylene Diamine Dihydriodide, BHT (a preservative), Ground Limestone, Deluforinated Phosphate, Salt, and Traces of Manganous Oxide, Magnesium Oxide, Iron Sulfate, Calcium Iodate, Iron Carbonate, Cobalt Carbonate, Copper Oxide and Zinc Oxide.

COMMERCIAL PRESTARTER COMPOSITION NO. 2

Ingredients: Ground Yellow Corn, Dried Whey, Sugar, Soybean Meal, Animal Fat Preserved with BHA, Brewer's Dried Yeast (Source of Vitamin $D_2$), Vitamin $B_{12}$ Supplement, Vitamin E Supplement, Menadione Sodium Bisulfite (Source of Vitamin K Activity), Riboflavin Supplement, Niacin, Calcium Pantothenate, Choline Chloride, Monosodium Glutamate, Ground Limestone, Dicalcium Phosphate, Salt, Copper Oxide, Cobalt Carbonate, Iron Sulfate, Manganous Oxide, Potassium Iodide and Zinc Oxide.

COMMERCIAL PRESTARTER COMPOSITION NO. 3

Ingredients: Cane Sugar, Rolled Oats, Dehulled Solvent Extracted Soybean Meal, Ground Corn, Condensed Fish Solubles, Corn Germ Meal, Cane Molasses, Dried Buttermilk, Dried Whey Product, Fish Meal, Meat Meal, Corn Distillers, Dried Solubles, Animal Fat, Vitamin A Palmitate (Stability Improved), Vitamin E Supplement, Menadione Sodium Bisulfite Complex (Source of Vitamin K Activity), Vitamin $B_{12}$ Supplement, Riboflavin Supplement, Niacin, Calcium Pantothenate BHT (A Preservative), D-Activated Animal Sterol (Source of Vitamin $D_3$--Stability Improved), Low Flourine Ground Rock Phosphate, Dicalcium Phosphate, Deflourinated Phosphate, Calcium Carbonate Salt, Mineral Oil, Sulfate of Iron, Copper Sulfate, Zinc Oxide, Copper Carbonate, Manganous Oxide, Magnesium Oxide, Potassium Iodide, Monosidum Glutamate.

The following Table II compares the growth and occurrence of scouring in groups of pigs feeding on the prestarter composition of this invention and on the three different well known commercial compositions. The pigs in each group were weaned from first litter gilts at an average of 3 weeks and 2 days without any prestarter being given to the pigs before weaning. There were seven pigs in each group with the pigs being randomly distributed so that each group had the heaviest pig from one litter, the second heaviest pig from another litter, the third heaviest pig from still another litter, and so forth until each group had one pig from each of seven litters. This randomized selection allowed for variations in genetic characteristics and weights of the pigs.

TABLE II

|  |  | LS-GH | COMM. No. 1 | COMM. No. 2 | COMM. No. 3 |
|---|---|---|---|---|---|
| First Two Weeks | ADG | .45 | .27 | .24 | .24 |
|  | lbs-feed/lb-gain | 1.57 | 2.22 | 2.42 | 3.10 |
| Last Two Weeks | ADG | .72 | .42 | .46 | .32 |
|  | lbs-feed/lb-gain | 2.15 | 3.25 | 2.60 | 4.10 |
| Total Four Weeks | ADG | .59 | .35 | .35 | .28 |
|  | lbs-feed/lg-gain | 1.93 | 2.88 | 2.53 | 3.67 |
|  | Cost--Gain | $15.44 | $26.62 | $18.46 | $26.62 |
|  | Scouring (1–10) | 2 | 6 | 7 | 8 |

Table II demonstrates the nutritional advantages of the prestarter composition of this invention, including a marked reduction in the incidence of scouring. The three commercial preparations tend to display similar patterns in animal growth and incidence of scouring; whereas the prestarter composition of the invention shows a markedly reduced incidence of scouring, and highly favorable cost advantages of the feed in attaining improved growth.

The preferred improved prestarter composition of the present invention, in accordance with the foregoing teaching, contains up to about 75% of wheat germ meal and high lysine corn; added lysine; and a total protein ratio not in excess of about 18%. The advantages of the prestarter composition are attained when high lysine corn is used having a lysine content of at least about 0.3% by weight of the corn, and providing such high lysine corn is present in a range of more than about 25% but less than about 65% by weight of the total composition. The added lysine is present in amounts of less than about one-half % by weight of the total composition; and the wheat germ meal is provided in a range of more than about 10% to less than about 40% by weight of the total composition. It is further seen that the high lysine corn and the wheat germ is provided in relative balance proportions so that either the high lysine corn or the wheat germ meal is increased as the other ingredient is reduced to substantially maintain the total protein ratio within the prescribed maximum level of less than about 18%.

It should be understood that some acceptable variations may be made from the foregoing ranges so long as the defined advantages and objects of the invention are attained. Such advantages are more particularly defined by providing that the total protein ratio is more than about 14% by weight of the total composition, the best mode presently contemplated providing such protein ratio to comprise between 15–17% by weight of the composition. A protein ratio of about 16% has been found to be highly desirable. The added lysine is preferably set at levels of about one-fourth % by weight. Preferred prestarter compositions further have a narrower range of wheat germ meal at 20–40% of the total composition, whereas the high lysine corn is generally present in amounts less than about 50% of the total composition. In particular, a high lysine corn content of about 40% by weight and a wheat germ meal content between about 30–40% by weight has been found to be highly desirable.

The claims of the invention are now presented, and the terms thereof may be better understood by reference to the language of the preceding specification.

What is claimed is:

1. A feed composition, including
   a total protein ratio not in excess of about 18%,
   high lysine corn having a lysine content of at least about 0.3% by weight of the corn, and present in a range of more then about 25% and less than about 65% by weight of the total composition,
   wheat germ meal in a range of about 10% to about 40% by weight of the total composition,
   a total lysine content of at least 1% by weight of the total composition, and
   said high lysine corn and wheat germ meal ingredients having relative proportions so that one ingredient is accordingly increased as the other is reduced to substantially maintain the total protein ratio within said prescribed maximum level of less than about 18%.

2. A feed composition which includes the features of claim 1 above, wherein said total protein ratio is more than about 14%

3. A feed composition which includes the features of claim 1 above, which composition has less than about 20% by weight of wheat germ meal, at least 40% by weight high lysine corn and about one-fourth % by weight of added lysine.

4. A feed composition which includes the features of claim 1 above, wherein said wheat germ meal is present in amounts at least about 205 by weight of the total composition, said high lysine corn is present in amounts less than about 50% by weight of the total composition, and said added lysine is present in an amount of about one-fourth % by weight of the composition.

5. A feed composition which includes the features of claim 1 above, wherein said total protein ratio is about 17% by weight, wherein said high lysine corn is about 40% by weight, and said wheat germ meal is between about 20% and 35% by weight of the total composition.

6. A feed composition which includes the features of claim 1 above, wherein said wheat germ meal and high lysine corn are present in substantially equal proportions of between about 30% and 40% by weight of the composition.

7. A feed composition which includes the features of claim 1 above, wherein said composition further includes a premix of vitamins, minerals and antibiotics.

8. A feed composition which includes the features of claim 7 above wherein said crude protein ratio is obtained essentially from wheat germ meal, high lysine corn, dried whey, and added lysine.

9. A feed composition which includes the features of claim 8 above, wherein said dried whey in present at about 10% by weight of the composition, said wheat germ meal is present at about 35% by weight of said composition, said high lysine corn is present at about 35% by weight of the composition, said added lysine is present at about 0.25% by weight of the composition, and said premix of vitamins, minerals and antibiotics is present at about 4% by weight of the composition.

10. A feed composition which includes the features of claim 9 above wherein said composition further includes about 15% weight of rolled oats, and said antibiotics in said premix is a mixture of chlortetracycline, sulfamethazine and procaine penicillin.

11. A feed composition which includes the features of claim 1 above, wherein said wheat germ meal and high lysine corn comprise up to about 75% by weight of the composition, the balance comprising a premix of vitamins, minerals and antibiotics, and other protein and carbohydrate sources.

12. A feed composition which includes the features of claim 11 above, wherein said composition further includes added lysine where the total lysine of the wheat germ meal and high lysine corn and other protein food sources in the composition is less than 1% by weight of the composition.

13. A feed composition which includes the features of claim 1 above, wherin said composition further includes added lysine up to about 0.25% by weight of the composition.

* * * * *